July 4, 1933.   J. BORNSTEIN   1,917,200
WIPER MECHANISM FOR WINDSHIELDS AND THE LIKE
Filed Aug. 6, 1929   5 Sheets-Sheet 1
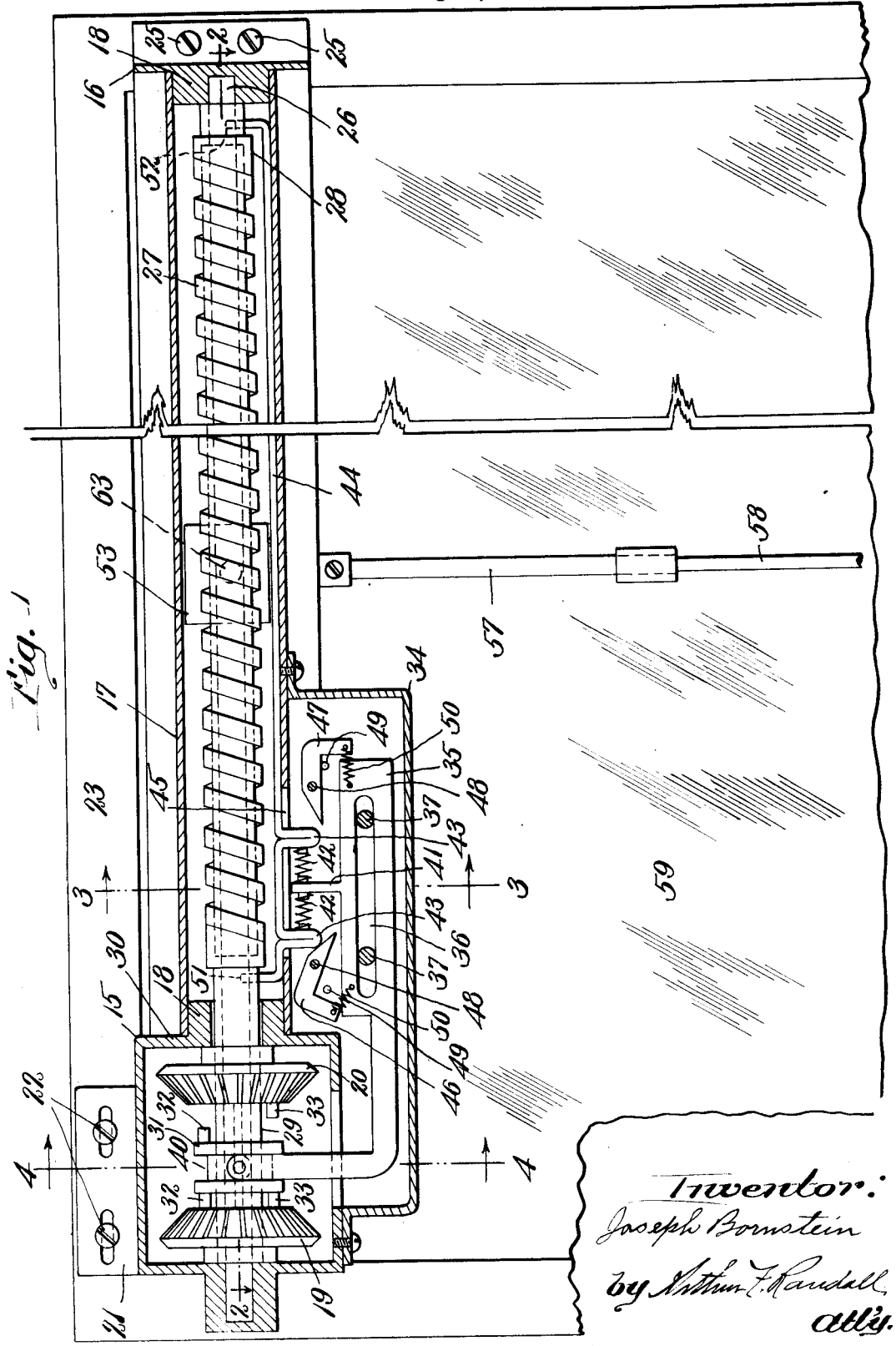

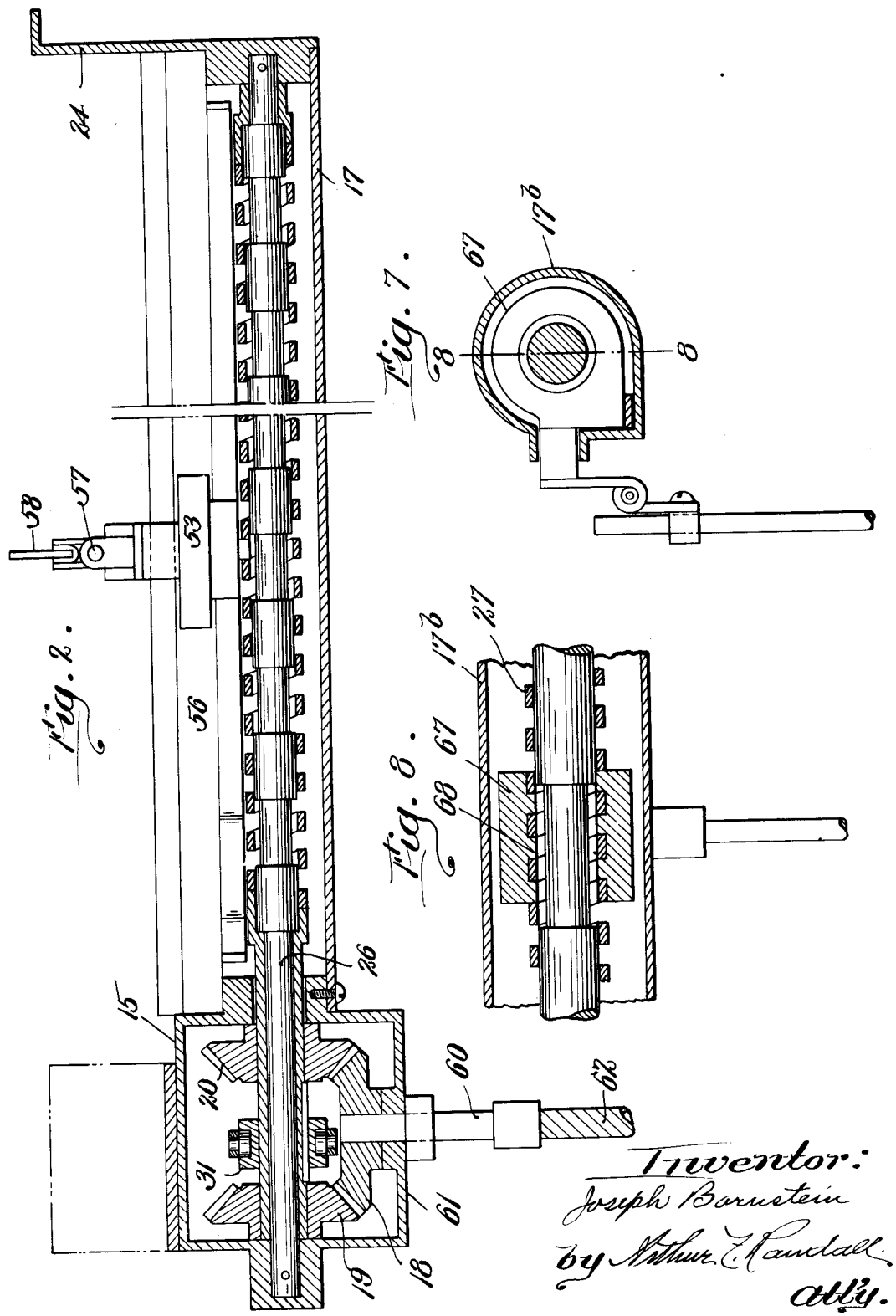

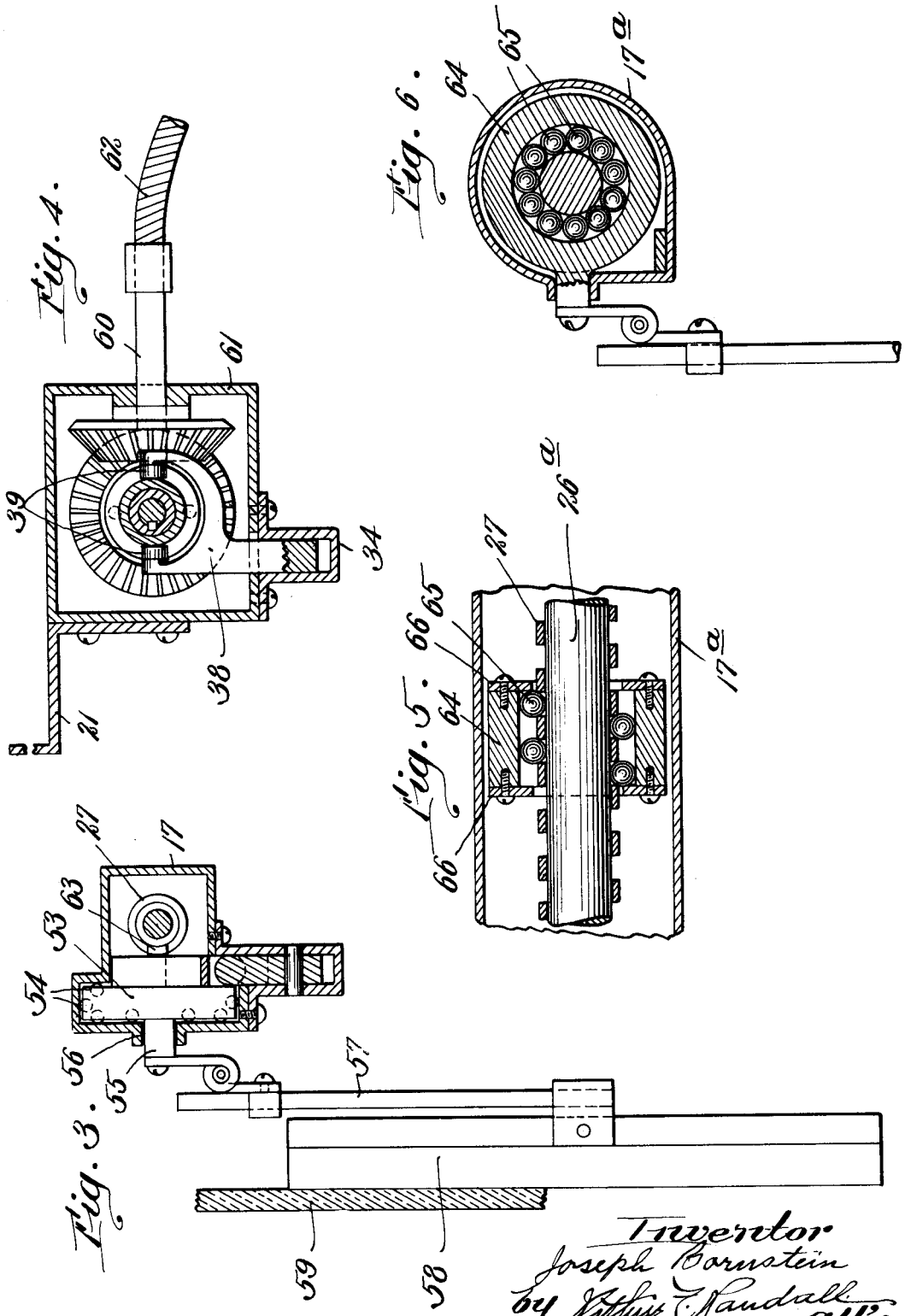

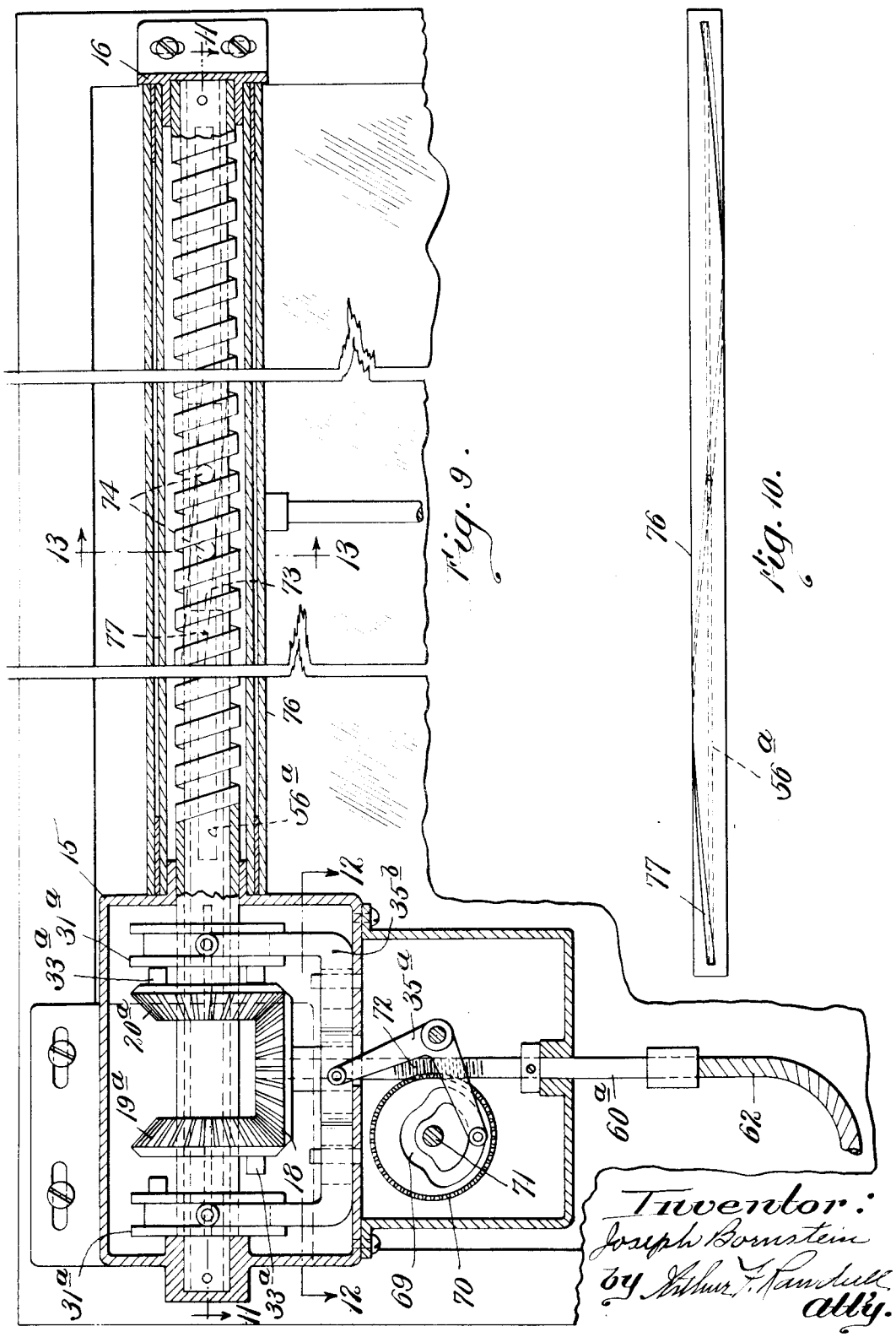

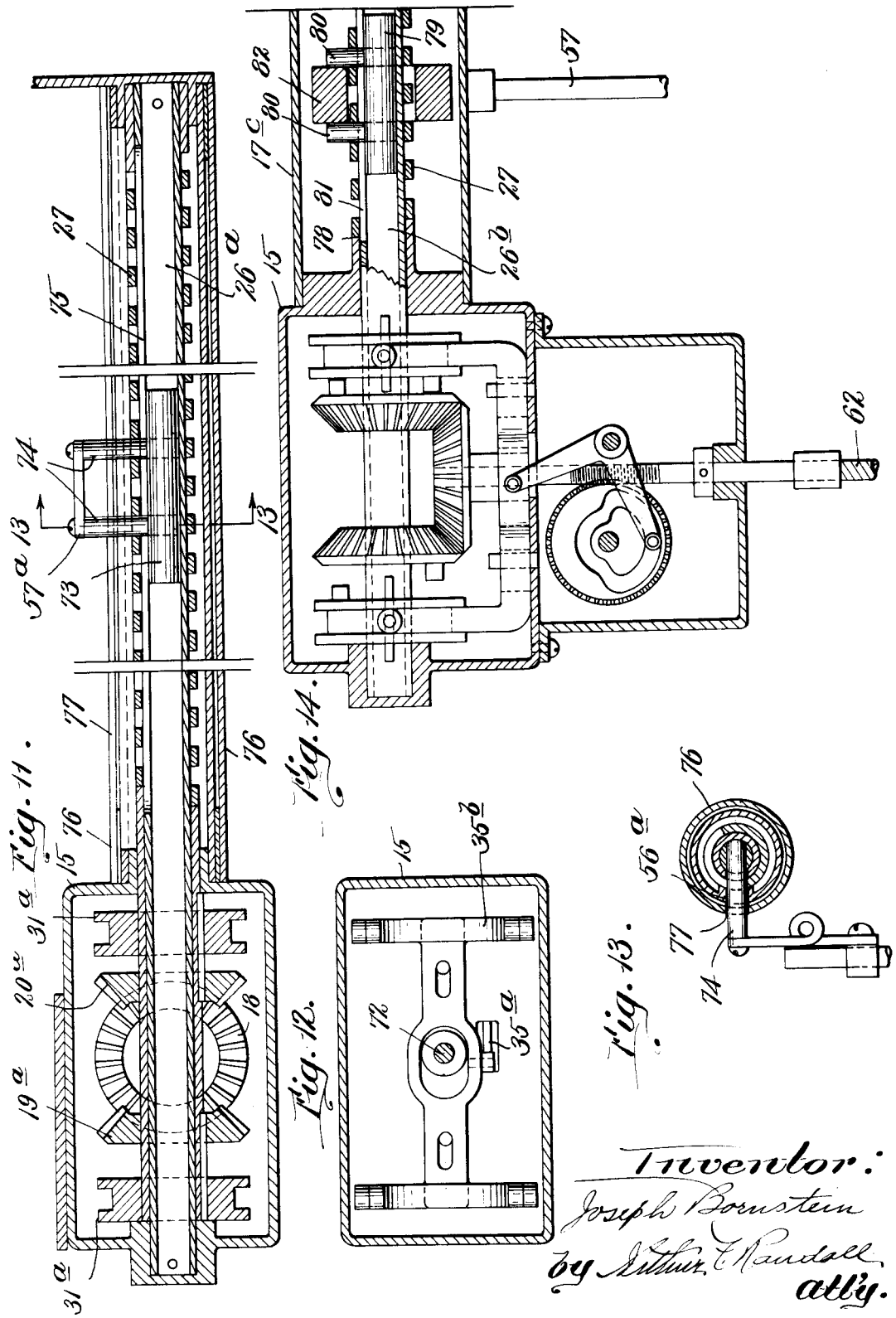

Patented July 4, 1933

1,917,200

UNITED STATES PATENT OFFICE

JOSEPH BORNSTEIN, OF BOSTON, MASSACHUSETTS, ASSIGNOR TO LOUIS BORNSTEIN, OF QUINCY, MASSACHUSETTS

WIPER MECHANISM FOR WINDSHIELDS AND THE LIKE

Application filed August 6, 1929. Serial No. 383,865.

My invention relates to wiper or cleaning mechanisms for windshields and the like and it has for its object to improve the construction of devices of this class.

The present invention has to do more particularly with wiper mechanisms of that class comprising a screw shaft that is alternately rotated in opposite directions to reciprocate the wiper carriage, or carriages, thereby to move the wiper, or wipers, back and forth across the windshield or window.

Mechanisms of this type are sometimes made with reversing gearing that is automatically adjusted by the wiper carriage at the end of each stroke thereof to reverse the direction of rotation of the screw shaft, and a feature of my present invention consists in providing a drive for the screw shaft including two oppositely driven continuously rotating members with which is associated a clutch member that is connected with the screw shaft and adjustable so as to be engaged with either one or the other of said members, novel means being provided through which said clutch member is automatically controlled and operated to cause said oppositely driven members to alternately drive the shaft in opposite directions thereby to reciprocate the wiper or wipers.

Another feature of my invention consists in constructing the screw shaft as a helically coiled strip, ribbon or band of metal supported interiorly at separated intervals throughout its length against lateral flexing by a rod forming part of the frame of the device.

Practically all wiper mechanisms of the class referred to are constructed with a frame including a tubular housing for the screw shaft that is formed with a longitudinal slot through which the wiper carriage extends from the screw to the exterior of said housing. One great disadvantage to the constructions heretofore proposed has been that dust, sand, grit and other matter would find its way through said slot into the housing and lodge upon the screw shaft, and upon the bearing surfaces of relatively movable parts, resulting in undue wear thereof and rendering the device noisy in operation and also noisy because of relative vibratory movements of its parts. Therefore, as another feature of my present invention, I have provided a housing for the screw shaft which, approximately, completely incloses the latter so that it has no open longitudinal slot as heretofore and consequently dust, dirt, sand and the like, is excluded from entering said housing.

In the best form of my invention the housing for the screw shaft comprises an inner fixed tubular section that is exteriorly circular in cross-section formed with the usual straight longitudinal slot, and an outer circular tubular section that is loosely and rotatably mounted upon and surrounds the fixed section. This outer tubular section is formed with a longitudinal spiral slot of comparatively steep pitch and at the point where this slot crosses the straight slot of the inner fixed section there is, of course, an opening. The wiper carriage extends from the screw through this opening to the exterior of the housing where it is provided with the usual glass-engaging wiper, and as said carriage is moved back and forth by the screw shaft the outer tubular section or sleeve is oscillated but since its slot is spiral and the slot of the inner fixed section is straight, it will be clear that the housing will be maintained closed at all times because the two slots cannot at any time be brought into register throughout their lengths.

Other features of my invention are hereinafter pointed out.

In the accompanying drawings:

Figure 1 is a front elevation of a portion of a wind-shield having applied thereto a wiper or cleaner mechanism constructed in accordance with my invention, said mechanism being shown mostly in section.

Figure 2 is a section on line 2—2 of Fig. 1.
Figure 3 is a section on line 3—3 of Fig. 1.
Figure 4 is a section on line 4—4 of Fig. 1.
Figure 5 is a sectional detail illustrating another form of wiper carriage.
Figure 6 is a section on line 6—6 of Fig. 5.
Figure 7 is a cross-sectional detail illustrating a third form of wiper carriage.
Figure 8 is a section on line 8—8 of Fig. 7.

Figure 9 is a front elevation of a portion of a wind-shield having applied thereto a wiper or cleaner mechanism constructed in accordance with my invention but illustrating other features thereof, said mechanism being shown mostly in central longitudinal section.

Figure 10 is an elevation, on reduced scale, of the closure tube hereinafter described.

Figure 11 is a section on line 11—11 of Fig. 9.

Figure 12 is a section on line 12—12 of Fig. 9.

Figure 13 is a section on line 13—13 of Figs. 9 and 11.

Figure 14 illustrates another form of wiper mechanism.

In the form of my invention illustrated in Figs. 1 to 4, inclusive, the main frame of the mechanism comprises two end sections 15 and 16 and an intermediate tubular section 17, the opposite ends of the latter being fitted telescopically upon bosses 18 provided on the end sections 15 and 16 to which said ends are rigidly fastened.

The end section 15 is made in the form of a box or housing for enclosing three intermeshing beveled gears 18, 19 and 20, and is provided with an apertured leg 21 fastened by bolts 22 to the top cross-bar of the frame 23 of the windshield. The opposite end section 16 is also made with an apertured leg 24 fastened by bolts 25 to one of the upright side bars of the windshield frame.

Within the intermediate tubular frame section 17 is a longitudinally disposed rod or bar 26 having one end thereof fixed within a socket provided in the end section 16. From end section 16 the rod or bar 26 extends through the tubular intermediate section 17 and the box-like end section 15 to the outer side wall of the latter where its opposite end is fastened within a socket provided in said side wall. Thus the rod or bar 26 serves as a tie-rod to assist in holding the three main parts or sections of the frame in assembled relationship.

Within the intermediate tubular frame section 17, and loosely mounted upon the rod or bar 26 is a screw-shaft section 27 consisting of a metal band or bar formed into helix whereof one end is fastened to one end of a sleeve 28 whose opposite end abuts the end section 16. At its opposite end the screw shaft section 27 is fastened to one end of a sleeve 29 which extends through the adjacent side wall 30 of the end section 15 into the latter where the two beveled gears 19 and 20 are loosely mounted upon it.

Splined upon the sleeve 29 in a position between the two gears 19 and 20 is a clutch member 31 carrying studs or pins 32 upon its opposite sides to co-operate with studs 33 projecting from the beveled gears 19 and 20.

Fastened by screws to the under sides of the frame sections 15 and 17 is a housing 34 within which is a shipper member 35 formed with a slot 36 through which extend two pins 37 by which the said shipper member is slidably supported so as to be movable in a direction parallel with the axis of sleeve 29.

Shipper member 35 is made at one end with an upwardly extending yoke 38 embracing clutch member 31 and carrying rolls 39 occupying a circumferential groove 40 formed in the clutch member 31.

Also, the shipper member 35 is made with an upwardly extending arm 41 whose upper end portion occupies a position between the inner ends of a pair of axially alined coiled springs 42 which abut at their outer ends against a pair of lugs or arms 43 extending downwardly from a slide bar 44 mounted within the tubular intermediate frame section 17 and movable longitudinally thereof. The bottom of section 17 is made with a slot 45 through which the lugs 43 extend downwardly into the housing 34 to engage the outer ends of the springs 42 and also to cooperate with a pair of opposed latches 46 and 47 pivotally connected at 48 with housing 34.

The latches 47 are yieldingly urged toward their operative positions against stops 49 by light springs 50.

At its opposite ends the slide bar 44 is made with upstanding arms 51 and 52, respectively, to co-operate with the wiper carriage 53 that is movably supported within and guided by, the intermediate frame section 17. This wiper carriage is a block of metal made upon its exterior with shallow pockets within which are seated anti-friction balls 54 which ride against the inner side section 17.

Carriage 53 is made with an extension 55 projecting out through a slot 56 formed longitudinally in the rear wall of section 17.

To the outer end of the extension 55 is fastened the stem 57 of a wiper or squeegee 58 that is fitted, as usual, against the glass 95 of the wind-shield.

As shown in Fig. 2 the beveled gear 18 is fast on the inner end of a spindle 60 journaled in a bearing provided in the front wall 61 of the frame section 15, and at its outer end spindle 60 is coupled to one end of a continuously rotated flexible shaft 62 connected with any convenient source of power.

The gear 18 rotates in a direction to drive the two gears 19 and 20 in opposite directions as indicated by the arrows in Fig. 1 and therefore when clutch member 31 is interlocked with gear 19 the screw shaft-section 27 will be driven in one direction and when interlocked with gear 20 said screw shaft-section will be driven in the opposite direction.

The wiper carriage 53 carries a stud 63 that occupies a position between two adjacent convolutions of shaft-section 27 and it will therefore be clear that when the screw shaft is rotated in either direction the carriage 53 is moved lengthwise of section 17.

Thus when the clutch member 31 occupies the position shown in Fig. 1 the screw shaft is rotating in a direction to propel carriage 53 toward the right and as said carriage nears the limit of its movement in this direction it engages the arm 52 and moves slide bar 44 endwise with it. At this time the latch 47 is in position to lock the shipper member 35 against movement toward the right with the result that the spring at the left of arm 41 (Fig. 1) is compressed until the lug 43 at the opposite side of arm 41 trips the latch 47 whereupon the compressed spring 42 throws the shipper member toward the right thereby transferring the clutch member to gear 20 and permitting the latch 46 to move down into its operative position so as to lock the shipper in position at the limit of its movement toward the right.

When the clutch member 31 is thus engaged with gear 20 the direction of rotation of shaft-section 27 is reversed and carriage 53 is moved back toward the left. As it nears the limit of its movement in this direction it engages the upstanding arm 51 of slide 44 and carries the latter with it thus compressing the spring 42 at the right of arm 41 until the lug 43 at the opposite side of arm 41 trips latch 46 whereupon the compressed spring 42 throws the shipper 35 to the limit of its movement toward the left where it is caught and locked by latch 47, thereby transferring the clutch member 31 to the gear 19 and again reversing the direction of movement of shaft-section 27 and carriage 53.

In this way the carriage 53 and wiper 58 are continuously reciprocated back and forth across the wind-shield.

It is a feature of the structure illustrated in Figs. 1 to 4, inclusive, that the rod or bar is made at separated intervals, throughout the portion thereof that is enclosed by shaft-section 27, with short isolated bearing enlargements whereby friction is reduced to the minimum and packing of dirt and grit between the bearing surfaces by the screw is avoided.

In Figs. 5 and 6 I have illustrated another form of wiper carriage 64 which is in the nature of a nut or annulus surrounding the screw shaft-section 27 whose "thread" consists of a spiral row of anti-friction steel balls 65 confined between washers 66 provided at the opposite sides of the carriage 64. These balls occupy positions between adjacent convolutions of shaft-section 27 and function as a thread through which rotation of shaft-section 27 propels the carriage 64 longitudinally with respect to the shaft-section. In this case the supporting rod 26a is made of uniform diameter throughout the length of shaft-section 27 and the intermediate frame section 17a may be made approximately circular in cross-section as shown in Fig. 6.

In Figs. 7 and 8 another form of carriage 67 is illustrated which is also a nut but made with an internal spiral thread 68 to mesh with the shaft-section 27.

In the form of my invention illustrated in Figs. 9 to 13, inclusive, the screw shaft sleeve 29 carries two loose beveled gears 19a and 20a continuously driven in opposite directions by the beveled gear 18 fast on the upper end of a vertical spindle 60a to the lower end of which is coupled the flexible drive shaft 62.

The gears 19a and 20a are provided upon their outer sides with lugs 33a to co-operate with clutch members 31a splined on the sleeve 29. These two clutch members are engaged by a shipper yoke 35b slidably mounted within frame section 15. One arm of a bell-crank shipper lever 35a is pivotally connected with slide 35b while the other arm thereof carries a cam roll engaged by a cam groove 69 provided upon one side of a worm wheel 70 rotatably supported by a shaft 71.

Worm wheel 70 is continuously driven by a worm 72 provided on the spindle 60a and is timed to make one-half a revolution during the travel of the wiper carriage 73 from one side of the windshield to the opposite.

During one half of the revolution of wheel 70 its cam groove acts through the connections described to hold one of the clutch members 31a engaged with gear 20a and during the other half-revolution to hold the other clutch member 31a engaged with beveled gear 19a. In this way the screw shaft is continuously rotated alternately in opposite directions thereby to reciprocate the wiper carriage 73, Figs. 11 and 13.

The intermediate tubular sheet metal frame section 17c is approximately circular in cross-section and made with a straight longitudinal slot 56a, Figs. 9 and 13 through which extend two posts or arms 74 forming part of the wiper carriage 73, the body portion of said carriage being a cylindrical metal block slidably fitted within a tubular rod or bar 26a which is likewise made with a straight longitudinal slot 75 at one side thereof through which the arms or posts 74 also extend. This tubular rod or bar 26a, like the rod 26 of Fig. 1, is fixed at its ends to the two end sections 15 and 16 of the frame and rotatably supports the spiral member 27 and the sleeve 29 to which member 27 is fastened at one end.

Thus the engagement of the posts or arms 74 with the opposite sides of the slots 56a and 75 holds the carriage 73 against turning within the tubular bar 26a while the rotation of the spiral member 27 causes the same to act against the sides of the posts or arms 74 to reciprocate the carriage when said spiral member is rotated.

The carriage 73 is equipped with the usual wiper whereof the stem 57a is shown as fastened by screws to the outer ends of the posts or arms 74.

Heretofore, the portions of the straight longitudinal slot 56a in the housing-frame not occupied by the wiper carriage have been open with the result that sand, dust and the like would be blown through the same into said housing and onto the screw shaft and bearing surfaces which was highly undesirable. Therefore, as a feature of my present invention, I have herein provided means for maintaining the slot 56a closed which, at the same time does not interfere with the reciprocatory movement of the wiper carriage.

Herein this closure means consists of a sleeve 76 formed with a spiral slot 77 of comparatively steep pitch so that the opposite side walls co-act with the posts or arms as cams and at the same time the spiral formation of slot 77 makes it impossible for the two slots 56a and 77 to register at any point other than that at which the two slots cross. The two arms or posts 74 extend through and occupy the hole at the place where the two slots cross while at all other points the slot 56a is closed by the sleeve 76.

It will be clear that as the wiper carriage is reciprocated the arms or posts 74 will act to oscillate the closure sleeve but the latter will nevertheless maintain the slot 56a closed at all times practically throughout its length.

Fig. 14 illustrates a form of my invention in which the spiral member 27 is fastened at 78 by soldering or otherwise to the inner side wall of the housing 15, said spiral member 27 being supported by a tubular shaft 26b that is connected with a continuously driven flexible shaft 62 by automatic driving mechanism like that described in connection with Fig. 9. Thus the tubular shaft 26b performs the function of supporting the spiral member 27 after the fashion of the rod 26 of Fig. 1 and the tubular rod 26a of Fig. 11.

Within the tubular shaft 26b is slidably fitted a cylindrical metal block 79 provided with a pair of pins 80 which project radially therefrom through a straight longitudinal slot 81 provided at one side of tubular shaft 26b and through spaces between convolutions of the spiral member 27b to engage the opposite sides of a wiper carriage 82 disposed mainly within the tubular intermediate frame-section 17c, the latter being made, as usual, with a straight longitudinal slot through which an extension of said wiper carriage 82 projects to the exterior of section 17c where it has connected to it the stem 57 on the wiper element.

It will thus be clear that the spiral member 27 is held immovable while the tubular shaft 26b and the cylindrical block 79 are rotated together alternately in opposite directions thereby reciprocating the wiper carriage 82.

Reference is herein made to my co-pending applications Serial Numbers 378,143 and 378,144, filed July 13, 1929, relating to Wiper mechanism for windshields and the like of the same class as those herein illustrated and described.

What I claim is:

1. The combination of a frame; a carriage movably supported by said frame; a worm shaft for reciprocating said carriage; a continuously driven member; power transmitting mechanism through which said continuously driven member operates said worm shaft, said mechanism being adjustable to reverse the direction of rotation of said worm shaft, a control member for said mechanism that is periodically adjusted alternately in opposite directions in timed relation with the movements of said carriage to cause said power transmitting mechanism to rotate said worm shaft alternately in opposite directions, a pair of latches for positively locking said periodically adjusted control member in its adjusted position during the interval of time between adjustments thereof and means through which said carriage controls and positively operates said latches in alternation.

2. In a mechanism of the character described, the combination of a cylindrically-spiral member; a slide element movably mounted within said cylindrically-spiral member and reciprocated longitudinally thereby; and means for rotating one of said members alternately in opposite directions while the other of said members is held against rotation, thereby to cause said cylindrically spiral member to reciprocate said slide element.

3. A mechanism of the character described, comprising a cylindrically-spiral member; a tubular member within said cylindrically-spiral member supporting the convolutions of the latter and made at one side thereof with a longitudinal slot; a carriage comprising a cylindrical portion slidably fitted within said slotted tubular member and made with a lateral extension projecting through the slot of said tubular member and through the space between two adjacent convolutions of said cylindrically-spiral member, and means for continually rotating one of said two members alternately in opposite directions thereby to reciprocate said carriage.

4. A mechanism of the character described, having in combination a cylindrically-spiral member; a tubular member within and supporting said cylindrically-spiral member made at one side thereof with a longitudinal slot; means for rotating one of said members alternately in opposite directions while the other of said members is held stationary; and a slide element movably mounted within said slotted tubular member and reciprocated longitudinally thereof by said cylindrically-spiral member.

5. The combination of a carriage; reversible driving mechanism for reciprocating said carriage; a control member for said mechanism that is adjustable to reverse the direction of movement imparted to said carriage by said driving mechanism; a pair of opposed springs through which said carriage acts to adjust said control member; a pair of opposed movably supported abutment latches for positively holding said control member against operation by said springs, and means through which said carriage controls and positively operates said latches to cause said springs to adjust said control member alternately in opposite directions in timed relation with the movements of said carriage thereby to cause said driving mechanism to continuously reciprocate said carraige.

6. A mechanism of the character described, comprising a fixed cylindrically-spiral member; a tubular member within said cylindrically-spiral member made at one side thereof with a longitudinal slot; means for rotating said slotted tubular member alternately in opposite directions, and a carriage comprising a cylindrical portion slidably fitted within said slotted tubular member and made with a pair of lateral extensions projecting radially through the slot of said tubular member and through spaces between convolutions of said fixed cylindrically-spiral member, said carriage also comprising an apertured slidably supported non-rotatable portion surrounding said cylindrically-spiral member between said lateral extensions.

7. A mechanism of the character described, having in combination a frame including a tubular section formed with a straight longitudinal slot; a tubular closure sleeve telescopically and rotatably associated with said section and made with a longitudinal spiral slot which crosses the slot of said section; a carriage within said tubular section and sleeve movable back and forth longitudinally thereof and made with a lateral extension projecting through both of said slots at the place where they cross; and means for reciprocating said carriage lengthwise of said tubular frame section and closure sleeve.

8. A mechanism of the character described, having in combination a frame including a tubular section formed with a straight longitudinal slot; a tubular closure sleeve telescopically and rotatably fitted upon the exterior of said section and made with a longitudinal spiral slot which crosses the slot of said section; a carriage within said tubular section and sleeve movable back and forth longitudinally thereof and made with a lateral extension projecting through both of said slots at the place where they cross; and means for reciprocating said carriage.

9. A mechanism of the character described, having in combination a carriage; revolvable helically coiled wire member for reciprocating said carriage; means for rotating said wire member alternately in opposite directions thereby to reciprocate said carriage, and supporting means for said helically coiled wire member that is telescopically associated with the latter so as to hold its convolutions in axial alinement.

Signed my me at Boston, Suffolk County, Massachusetts, this 1st day of August, 1929.

JOSEPH BORNSTEIN.